(12) United States Patent
Brennan (10) Patent No.: US 8,875,998 B2
(45) Date of Patent: Nov. 4, 2014

(54) MIDDLE CLASS AMERICA CARD

(71) Applicant: Sherry Brennan, San Rafael, CA (US)

(72) Inventor: Sherry Brennan, San Rafael, CA (US)

(73) Assignee: Sherry Brennan, San Rafael, CA (US)

( * ) Notice: Subject to any disclaimer, the term of this patent is extended or adjusted under 35 U.S.C. 154(b) by 0 days.

(21) Appl. No.: 13/830,582

(22) Filed: Mar. 14, 2013

(65) Prior Publication Data

US 2014/0021252 A1 Jan. 23, 2014

Related U.S. Application Data

(60) Provisional application No. 61/674,652, filed on Jul. 23, 2012.

(51) Int. Cl.
- *G06K 5/00* (2006.01)
- *G06K 7/08* (2006.01)
- *G06K 19/06* (2006.01)
- *G06Q 40/02* (2012.01)
- *G06Q 20/34* (2012.01)
- *G06Q 20/40* (2012.01)

(52) U.S. Cl.
CPC .............. *G06Q 20/341* (2013.01); *G06Q 40/02* (2013.01); *G06Q 20/405* (2013.01)
USPC ............................. 235/380; 235/451; 235/492

(58) Field of Classification Search
CPC ....... G06Q 20/22; G06Q 20/26; G06Q 20/28; G06Q 20/30; G06Q 20/32; G06Q 20/322; G06Q 20/325; G06Q 20/327; G06Q 20/3278; G06Q 20/34; G06Q 20/341; G06Q 20/357; G06Q 20/3572; G06Q 20/3574; G06Q 20/3576; G06Q 20/367; G06Q 20/36; G06Q 20/363; G07F 19/20; G06K 1/00; C03C 2217/94
USPC ......... 235/379, 380, 449, 451, 492, 493, 375, 235/383
See application file for complete search history.

(56) References Cited

U.S. PATENT DOCUMENTS 4,091,448 A * 5/1978 Clausing ....................... 235/379
4,868,376 A 9/1989 Lessin et al.
(Continued)

FOREIGN PATENT DOCUMENTS

WO 2014018418 A1 1/2014

OTHER PUBLICATIONS

Afnor Normalisation, ISO/IEC JTC Draft Standard, Dec. 20, 2012, 14 pages.

(Continued)

*Primary Examiner* — Tuyen K Vo
(74) *Attorney, Agent, or Firm* — GTC Law Group LLP & Affiliates (57) ABSTRACT

A debit card with automatic savings is disclosed. The card allows a user, such as the holder of the debit card, to automatically save a specified amount of money each time a transaction is conducted with the debit card, or according to another desired condition, such as once per week. When the card is used for a transaction, the specified amount of money is deducted from the available balance of the card and is added to one or more savings accounts maintained on the card. The debit card includes at least a microprocessor or microcontroller and sufficient memory for storing balances on the card, including the balance available for spending and a total for each savings account. The user may change the amounts desired for savings and may transfer the amount "saved" to the available balance when the user wishes to redeem the savings for desired goods or services.

20 Claims, 4 Drawing Sheets

(56) References Cited

U.S. PATENT DOCUMENTS

| | | | |
|---|---|---|---|
| 5,728,998 | A | 3/1998 | Novis et al. |
| 5,748,737 | A | 5/1998 | Daggar |
| 5,763,862 | A | 6/1998 | Jachimowicz et al. |
| 5,786,587 | A | 7/1998 | Colgate, Jr. |
| 5,936,220 | A | 8/1999 | Hoshino et al. |
| 5,945,652 | A | 8/1999 | Ohki et al. |
| 5,987,438 | A | 11/1999 | Nakano et al. |
| 6,014,648 | A | 1/2000 | Brennan |
| 6,016,484 | A | 1/2000 | Williams et al. |
| 6,016,954 | A | 1/2000 | Abe et al. |
| 6,058,378 | A | 5/2000 | Clark et al. |
| 6,065,674 | A | 5/2000 | Shriver |
| 6,164,533 | A | 12/2000 | Barton |
| 6,223,984 | B1 | 5/2001 | Renner et al. |
| 6,237,848 | B1 | 5/2001 | Everett |
| 6,595,413 | B1 | 7/2003 | Sugita |
| 6,678,753 | B1 | 1/2004 | Tanaka |
| 6,687,350 | B1 | 2/2004 | Landry et al. |
| 6,954,133 | B2 | 10/2005 | McGregor et al. |
| 7,043,493 | B2 | 5/2006 | Guthery |
| 7,677,457 | B2 | 3/2010 | Madej |
| 7,721,954 | B1 | 5/2010 | Karamian et al. |
| 7,725,391 | B1* | 5/2010 | Ley et al. .................... 705/39 |
| 7,726,566 | B2 | 6/2010 | Brown et al. |
| 7,766,243 | B2 | 8/2010 | Adams et al. |
| 7,784,687 | B2 | 8/2010 | Mullen et al. |
| 7,793,851 | B2 | 9/2010 | Mullen |
| 7,970,669 | B1 | 6/2011 | Santos |
| 8,025,217 | B2* | 9/2011 | Burke ...................... 235/379 |
| 8,752,759 | B1* | 6/2014 | Pletz et al. ................ 235/375 |
| 2004/0083183 | A1 | 4/2004 | Hardesty et al. |
| 2005/0017068 | A1 | 1/2005 | Zalewski et al. |
| 2005/0131792 | A1 | 6/2005 | Rowe |
| 2006/0038004 | A1 | 2/2006 | Rielly et al. |
| 2006/0047589 | A1* | 3/2006 | Grau ........................ 705/35 |
| 2006/0212393 | A1 | 9/2006 | Brown |
| 2007/0011089 | A1 | 1/2007 | DeSchryver et al. |
| 2007/0061252 | A1* | 3/2007 | Burke ...................... 705/39 |
| 2007/0080213 | A1* | 4/2007 | Workman et al. ......... 235/380 |
| 2008/0033722 | A1 | 2/2008 | Beenau et al. |
| 2009/0033824 | A1* | 2/2009 | Nishikawa et al. ........ 349/58 |
| 2009/0112760 | A1* | 4/2009 | Johnson et al. ............ 705/40 |
| 2009/0159663 | A1* | 6/2009 | Mullen et al. ............. 235/379 |
| 2009/0159681 | A1 | 6/2009 | Mullen et al. |
| 2009/0233640 | A1 | 9/2009 | Kurihara et al. |
| 2010/0059587 | A1 | 3/2010 | Miller et al. |
| 2010/0173678 | A1 | 7/2010 | Kim et al. |
| 2011/0226852 | A1 | 9/2011 | Brennan |
| 2012/0059751 | A1* | 3/2012 | Hangartner et al. ....... 705/35 |

OTHER PUBLICATIONS

American Banker, Reaching the Underbanked? Try Offering Control, Research Says, Mar 6, 2013, 3 pages.
The Nonprofit's Guide to Prepaid Cards, from Center for Financial Services Innovation (CFSI), Sep. 2010; 42 pages.
How Should We Serve the Short-Term Credit Needs of Low-Income Consumers?, Joint Center for Housing Studies, Harvard University, by Melissa Koide and Rachel Schneider, Aug. 2010; 30 pages.
Quick Credit The Fringe Economy, the Great Recession, and the Welfare State, New America Foundation, by David Stoesz, Aug. 2010; 23 pages.
Eppicard glitch causes delays for benefits recipients; Christian Science Monitor at ChristianScienceMonitor.com, Sep. 7, 2010; 2 pages.
Payment Card Issuer Strategies 2010: The Rise of the Cautious Consumer, Javelin Strategy and Research, Pleasanton, CA, U.S.A. (publicly available excerpt), 2010, 2 pages.
A Short History of the Debit Card, Jennifer Collins, marketplace.org, Aug. 18, 2011, 3 pages.
Untitled Article from PaymentsSource, http://www/paymentssource.com, which begins "Smaller Merchants can steer some of their transactions to debit networks" . . . , Jul. 28, 2008, 1 page.
Discussion of Financial Service Innovations for the Underbanked/Underserved posted on LinkenIn.com, approx. Apr. 2010, 2 pages.
Discussion of Financial Service Innovations for the Underbanked/Underserved posted on LinkenIn.com, Aug. 24, 2010, 3 pages.
XIPWire Postings at https://xipwire.com, Sep. 26, 2010, 5 pages.
"Acculynk Forms Internet—PIN Debit Advisory Council", PaymentsSource, http://www.paymentssource.com, Feb. 25, 2010, 2 pages.
"Get it Right: Underbanked is Launching Mobile Payments", source unknown, Sep. 26, 2010, 1 pages.
"Our view on bank fees: How a cup of coffee can set you back an extra $34", USA Today at http://blogs.usatoday.com/oped/2008/06/our-view-on-ban.html, Jun. 2008, 1 page.
"PageOnce Windows Phone App Makes Personal Finance Portable", https://www.mybanktracker.com, Oct. 11, 2010, 2 pages.
"Retail Banking Innovation", from americanbanker@m.americanbanker.com, Apr. 29, 2010, 1 page.
"Sears is Back, Targeting the Underbanked", from conferences@m.sourcemediaconferences.com, May 14, 2010, 2 pages.
"The Fed's Responsibility", The New York Times at http://www.nytimes.com, Mar. 15, 2010, 1 page.
"The good, bad and the ugly of credit card offers", http://www.foxbusiness.com, Sep. 23, 2010, 3 pages.
"USAA Offers Check Deposit by iPhone; An Ideal Option for Banks Lacking ATMs?", source unknown, Aug. 13, 2009, 1 page.
"Visa Europe Says New CodeSure Card Will Reduce Card-Not-Present Fraud", Payments Source, http://www.paymentssource.com, Jun. 2, 2010, 1 page.
Boyer, Meghan, "Acculynk Extends Product Line, Develops ISO Reseller Program", PaymentsSource, http://www.paymentssource.com, Apr. 8, 2010, 1 page.
Boyer, Meghan, "Mobile Payment Opportunities and Hurdles Exist for ISOs", posted on PaymentsSource, http://www.paymentssource.com, from the Jan./Feb. 2009 issue of ISO&Agent magazine, Feb. 6, 2009, 4 pages.
Diamond, Michael, "Viewpoint: Draw on Old Lessons for a Quick Mobile Transition", from American Banker, http://www.americanbanker.com, Sep. 24, 2010, 3 pages.
Edwards, Drew, "Self Serve is Coming for the Underbanked", CHEXAR Networks, Inc., Sep. 28, 2010, 5 pages.
Fitzgerald, Kate, "Visa Adds Five Merchants to Business Card Savings Program", PaymentsSource, http://www.paymentssource.com, Apr. 12, 2010, 1 page.
Fitzgerald, Kate, "Visa to Test a System that Brings Payments to Phones", from PaymentsSouce, posted on http://www.americanbanker.com, Feb. 16, 2010, 2 pages.
Helmer, Jodi, "After you yap, try a credit card app", http://www.creditcards.com, Feb. 2010, 4 pages.
Hernandez, Will, "Chase Beats Other Big Banks to Mobile Remote-Deposit Capture", PaymentsSource, http://www.paymentssource.com, Jul. 6, 2010, 2 pages.
Hernandez, Will, "New Credit Card Rules Create Opportunity for Prepaid Industry", PaymentsSource, http://www.paymentssource.com, Feb. 25, 2010, 2 pages.
Isberg, Pete, "Payroll Debit Cards Offer Enhanced Consumer Protection", www.americanpayroll.org, Mar. 2010, pp. 58-59.
Johnson, Andrew, "Citi Launches Shopping App", PaymentsSource, http://www.paymentssource.com, Jun. 16, 2010, 2 pages.
Martin, Andrew, "How Visa, Using Card Fees, Dominates a Market", The New York Times at http://www.nytimes.com, Jan. 5, 2010, 5 pages.
Robertson, Beth et al., "The Rise of the Cautious Consumer", Javelin Strategy & Research, Pleasanton, CA, www.javelinstrategy.com, Aug. 2010, 10 pages.
Rousseau-Anderson, Jackie, "Examining Consumers and Technology: The 2010 US Benchmark Data Report", Forrester Blogs, http://blogs.forrester.com, Sep. 22, 2010, 2 pages.
Sausner, Rebecca, "U.S. Bank Reveals Mobile Roadmap", PaymentsSource, http://www.paymentssource.com, Jun. 8, 2010, 2 pages.
Vance, Ashlee, "For Chip Makers, the Next Battle is in Smartphones", The New York Times at http://www.nytimes.com, Feb. 22, 2010, 3 pages.

(56) References Cited

OTHER PUBLICATIONS

Williams, Geoff, "Coming to your bank in 2010: New products and lots of fees", http://www.walletpop.com, Jan. 6, 2010, 3 pages.

Williams, Geoff, "The latest in sneaky credit card fees", http://www.walletpop.com, Jul. 21, 2010, 2 pages.

Wolfe, Daniel, "A Surprise Mobile Banking Clientele: The Underbanked", PaymentsSource, http://www.paymentssource.com, Aug. 24, 2010, 2 pages.

Wolfe, Daniel, "European Issuers Adding Display Screens to Cards", American Banker, http://www.americanbanker.com, Jun. 7, 2010, 2 pages.

Wolfe, Daniel, "Hypercom Enters Smartphone Card-Reader Marker", PaymentsSource, http://www.paymentssource.com, Apr. 13, 2010, 1 page.

Wolfe, Daniel, "MasterCard to Open Its Software for Application Development", PaymentsSource, http://www.paymentssource.com, May 25, 2010, 1 page.

Wolfe, Daniel, "Upside for Mobile Payments Comes Before the Payment", PaymentsSource, http://www.paymentssource.com, May 25, 2010, 3 pages.

Wolfe, Daniel, "Why Android Is Attractive for Alt-Payment Companies", PaymentsSource, http://www.paymentssource.com, Jun. 4, 2010, 3 pages.

Woodward, Kevin, "First Data Taps MicroSD Cards as Next Contactless Step", PaymentsSource, http://www.paymentssource.com, Mar. 16, 2010, 1 page.

PCT/US2013/051401, International Application Serial No. PCT/US2013/051401, International Search Report and Written Opinion mailed Dec. 10, 2013, Brennan, Sherry, 12 Pages.

\* cited by examiner

MIDDLE CLASS AMERICA CARD

CLAIM TO PRIORITY

This application claims priority to, and the benefit of, U.S. Provisional Appl. 61/674,652, filed Jul. 23, 2012, of the same title, which is hereby incorporated by reference in its entirety.

TECHNICAL FIELD

This application relates to the field of debit cards and more particularly to ways to increase the usefulness of debit cards, such as prepaid debit cards, to users, especially to unbanked, underbanked, or underserved users.

BACKGROUND

Debit cards are a form of smart cards. A smart card is a plastic card with an embedded microchip that allows its owner to use, among other things, the smart card as a substitute for cash in purchasing a wide variety of goods and services. Smart cards are well known and have enjoyed wide commercial success, particularly in Europe and Asia, and are now becoming well known and widely accepted in the United States. Smart cards typically conform to ISO Standard 7816-4 from the International Standards Organization (ISO) and include an embedded internal microprocessor or microcontroller. At present, smart cards used in the financial sector take three forms: (1) a re-loadable, prepaid debit card that can be purchased at a variety of stores; (2) a debit card associated with a checking account at a bank; and (3) a typical credit card issued by a bank or a banking institution such as Discover®, Visa®, or Mastercard®. Embodiments include debit cards using a magnetic strip, as well as versions with embedded printed circuits or embedded microchips.

One innovation of prepaid smart cards, or prepaid debit cards, is that they can be programmed to store a numerical value equaling the prepayment in cash by its owner and to deduct expenditures from the monetary value until the value is expended (i.e., zero balance is shown). The owner can then re-load or "top-up" the debit card by prepayment in cash and continue to use the same card. Thus, a prepaid debit card provides the convenience of a credit card, but does not require pre-qualification as to credit history, income, or the like. At any one time, a debit card can store a value of any monetary amount that has been credited to the user's card or user's checking account at a bank or banking institution. See *The Non-Profit's Guide to Prepaid Cards*, The Center for Financial Services Innovation, Chicago, Ill., September 2010. Further advantages of prepaid debit cards are that they eliminate the need to verify the ownership or the credit status and compliance of the user. A debit or credit card is typically activated by a personal PIN number to protect the owner from theft; thus, the particular smart card is of no value to anyone except the owner who possesses the PIN number. Other aspects of electronic cards, such as debit cards, are discussed in co-owned U.S. Pat. No. 6,014,648, entitled Electronic Card Valet, and U.S. patent application Ser. No. 13/049,479, entitled Multi-Use Electronic Card Balance Reader, both of which are hereby incorporated by reference in their entirety.

A debit card associated with a checking account at a bank allows the card owner the convenience of the use of an electronic card in his or her daily purchases. The amount of money available to the owner is the amount found in the debit card owner's checking account. This kind of debit card is helpful to the card owner in that he or she is only able to spend existing funds, and this reduces the chance of future indebtedness.

A further characteristic of the prepaid debit card is that, as with cash transactions, no individual record of types of purchase is identified, allowing for the privacy of one's own transactions. Of course, if the debit card is linked to a financial institution, such as a bank, the bank keeps records of each transaction for later use by the card holder. Thus, the debit card provides the privacy of cash, but the safety and convenience of credit cards. In many countries around the world, the smart card is a branded cash alternative for a wide range of goods and services, including telephone calls, highway tolls, retail store purchases, restaurant charges, taxicab charges, etc. In one sense, branded smart cards may be similar to prepaid debit cards, in the sense that the owner recognizes a limit to the utility of the card. However, if overcharges are allowed, the penalties or charges for going beyond the card limit may be onerous for many middle-class customers and especially for the unbanked, underbanked, or underserved users of such cards.

Unbanked individuals refers to individuals who conduct their financial lives entirely outside traditional banks and credit unions, while underbanked individuals are those who maintain a checking or savings account while also using alternative providers, such as payday loans. The credit needs of the unbanked and underbanked have been well documented. See, for example, How *Should We Serve the Short-Term Credit Needs of Low-Income Consumers?*, Melissa Koide and Rachel Schneider, Joint Center for Housing Studies, Harvard University, August 2010 (MF10-2). See also, *Quick Credit: The Fringe Economy, the Great Recession, and the Welfare State*, David Stoez, New America Foundation, Washington, D.C., August 2010, for a discussion of the unbanked and underbanked. Smart cards, such as prepaid debit cards, at least allow these populations to pay bills and transact business with means other than cash. These populations can least afford overcharges and may benefit from increased use of financial smart cards and the new financial regulations at the federal level.

In an example, a recent article from American Banker entitled *Reaching the Underbanked? Try Offering Control, Research Says*, noted that nearly 40 million American adults are underbanked and have difficult times in conducting basic financial activities such as paying bills. People who are underbanked tend to carry "wads of cash in their pockets and have to physically walk into a utility office to pay bills, into a store to pay off retail cards," or into a telephone storefront to pay off a cell phone bill in cash. Citing Mark Schwanhausser of Javelin Strategy and Research, "It paints a picture of how difficult it must be to be underbanked. It's hard to understand what life would be like without a basic banking account. It's like oxygen. A prepaid card may be a different flow of oxygen. But you have to have some kind of financial building block in which to start building access to credit, one of the aspects of building a life." To reach this goal, the underbanked need a "sense of control and oversight." *American Banker*, Mar. 6, 2013, article is suggesting that prepaid debit cards may help. Article available at http://americanbanker.com/issues/178_45/reaching-the-underbanked-try-offering-control. The banking industry recognizes these issues in its attempt to reach a new banking market (the unbanked, the underbanked) while still placing maximum profitability as its priority.

Increased financial regulations were enacted during the recession of 2008-2010, such as the Credit Card Accountability, Responsibility and Disclosure (Credit CARD) Act of 2009, the Durbin Amendment to the Dodd-Frank Bill, and Regulation E. In addition, a new Consumer Financial Protection Bureau is underway, and is expected to result in at least minimal re-regulation of the banking industry. This means increased protection for consumers. At least one practical result is that banks are already searching for ways to alternatively maximize their revenues while complying with the new regulations. See *Payment Card Issuer Strategies* 2010: *The Rise of the Cautious Consumer*, Javelin Strategy and Research, Pleasanton, Calif., U.S.A. (publicly available excerpt). Some financial institutions even charge for calls to customer service. *Eppicard Glitch causes delays for benefits recipients*, Christian Science Monitor, Sep. 26, 2010, at http://www.csmonitor.com/layout/set/print/content/view/print/324206.

Sophisticated strategies from the banks may now focus on whether to allow overdrafts at all for their checking account, credit card, and debit card holders, and if so, how to comply with the new regulations and still continue to maintain a highly profitable revenue stream. For example, while credit cards have seen significant changes in the electronic card arena, prepaid, re-loadable debit cards do not appear to have been affected by the new regulations. To add to this, the popularity of such cards has grown dramatically, perhaps because they are easier to obtain and satisfactorily accommodate the day-to-day financial transaction needs of the average person. In fact, a 2011 IBOPE Zogby International survey found that consumers making everyday purchases use their debit cards 55% of the time, more than half the time. *A Short History of the Debit Card*, Jennifer Collins, marketplace.org, May 4, 2012, at http://www.marketplace.org/topics/business/news-brief/short-history-debit-card. From a financial institution's point of view, the debit cards are especially popular: Standard bank check processing and clearing fees are eliminated; there is no extension of credit; and the balance that is prepaid is available to the financial institution until presentment from a merchant or other creditor. The principal cloud on the horizon, or perhaps nearer than the horizon, is the new monthly fee charges sought by banks for debit card users.

As debit cards, especially pre-paid, re-loadable debit cards, become even more popular, consumers will want to make more use of them. For example, present debit cards typically include only an internal available balance, the amount of money remaining on a card that is available for the user to spend, and is knowable to the consumer only if he or she is doing business with a merchant whose receipt indicates a card balance, along with other particulars of the transaction.

The debit card would be more useful to the consumer if there were a way to use the debit card to establish and grow a savings account, i.e., a sum of money that remains on the card but is segregated and is not available for immediate spending by the user. A consumer and debit card user would benefit if there were a way to use the debit card to establish one or more savings accounts.

BRIEF SUMMARY OF THE INVENTION

One embodiment is an electronic card for saving money. The electronic card includes a debit card having an interface for electronic transaction devices, a processor operably connected to the interface and having at least one memory sufficient for storing data and a computer software program, the processor suitable for manipulating data in the at least one memory, wherein the computer program cooperates with the processor and the at least one memory to accomplish the following steps:

i. maintain an overall balance of the debit card;
    ii. maintain an available balance of the debit card;
    iii. maintain a balance on the debit card for at least one savings account;
    iv. each time a purchasing transaction is accomplished with the debit card, subtract an amount from the available balance and add the amount to the at least one savings account; and
    v. accept changes to the computer program to change the amount, wherein the overall balance of the debit card comprises the available balance and a balance of the at least one savings account.

Another embodiment is a machine readable medium having non-transitory program instructions stored thereon for saving money using a debit card. The program instructions include steps of accepting an available balance on the debit card, storing the available balance in at least one memory of the debit card, storing a balance for at least one savings account in the at least one memory of the debit card, storing at least one rule for subtracting an amount from the available balance and adding the amount to the at least one savings account, subtracting an amount from the available balance and adding the amount to the at least one savings account when a condition of the at least one rule is fulfilled, and maintaining the available balance and a balance for the at least one savings account. The machine readable instruction of the computer program cooperates with the microprocessor and the at least one memory to accomplish the following steps:

i. store an overall balance;
    ii. store the available balance;
    iii. store the balance of the at least one savings account;
    iv. when the condition of the at least one rule is fulfilled, subtract the amount from the available balance and add the amount to the at least one savings account; and
    v. accept changes to the computer program to change the amount, wherein the overall balance of the debit card comprises the available balance and the balance in the at least one savings account.

Another embodiment is a method of saving money. The method includes step of depositing an available balance on a debit card, starting at least one savings account on the debit card, the at least one savings account comprising money, specifying at least one rule for adding money to the at least one savings account while subtracting money from the available balance, on the debit card, and automatically adding an amount of money to the at least one savings account and subtracting the amount of money from the available balance according to the at least one rule, on the debit card.

Another embodiment is an electronic card incorporating a keyboard. The electronic card includes a plastic card with a plurality of alphabetical or numeric keys. The keys include at least numbers zero through nine. In one embodiment, the keys include sufficient letter keys to communicate at least consonants of a Romance language. In another embodiment, the keys further include vowels of the Romance language. In other embodiments, additional function keys are included.

Another embodiment is an electronic card incorporating a movable screen. The card includes a fixed bottom portion and a movable top portion. The bottom portion includes a plurality of function keys and circuitry for operating the electronic card. The screen is stored within the bottom portion and is releasable by a user of the card. In one embodiment, the screen includes a durable coating of chemically-strengthened glass having inherent compressive stress.

Other embodiments and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings.

While the invention will be described in connection with certain preferred embodiments, there is no intent to limit it to those embodiments. The intent is to cover all alternatives, modifications, and equivalents as included within the spirit and scope of the invention as defined by the appended claims.

DETAILED DESCRIPTION

Smart cards continue the trend of non-cash transactions that include the use of notes, early paper money, checks, and credit and debit cards. Each of these innovations arose because it is inconvenient and may be unsafe to carry sufficient specie or cash for one's needs for a long period of time or while traveling. While each of these has advantages over cash, each also has a disadvantage. For unbanked, underbanked, or underserved users, a disadvantage of debit cards is that there is no easy way to segregate funds in the debit card and place them into a separate savings category. The methods and systems described herein, referred to in some cases as the "Middle Class America Card" may be the first opportunity for these populations to acquire realistic financial management skills. While wealthier populations may have numerous opportunities and options for wealth management, this is not the case for the unbanked, underbanked and underserved populations. Acquiring such skills is necessary to empower an individual in managing his or her financial life.

For example, a customer at a bank or a savings and loan may open a separate savings account or even a separate "Christmas savings" account. Under the practices of most financial institutions, the funds of these accounts are, for practical purposes, immediately available to the saver. Banking laws and regulations for savings accounts typically specify a short waiting period for the saver to access the funds. In practice, however, the savings are treated as demand deposits, available immediately to the saver, just as are the funds in a checking account. These easy ways to save and to redeem savings are not available, however, to the unbanked or underbanked. All that may be available to these populations is a debit card, such as a prepaid debit card or a debit card associated with an employer or a government agency.

The usage of debit cards has expanded exponentially in the United States. Transfer payments in ever-increasing numbers are made electronically from government agencies to debit cards issued by the agency. Governments, such as the federal government, and private employers, such as Wal-Mart®, are cutting costs by requiring employees to accept their wages via direct deposit or to a debit card account. Of course, the payment in these instances may actually be made to a financial institution issuing the debit card, but the payment transaction is transparent to the user, to whom it may seem that the payment has been made directly to the debit card. Thus, private and public employers may pay their employees using an account at a financial institution that is linked to the employee's debit card.

With the electronic payments as described, the agency or the employer need not issue checks, while the beneficiary or employee does not have to pay check-cashing fees. Instead, the debit card may be used immediately for purchases, or in some instances, at automatic teller machines (ATMs). The cards used herein may be described as a personalized electronic money card, and may also be known as the Middle Class America Card.

It may be useful to explain several terms used in this disclosure. The available balance is the amount of the user's funds less any amounts withheld by the institution awaiting clearance, and less any amounts which are on "hold" by creditors. For example, debit cards are used not merely for transactions, but by certain vendors, such as hotels or rental agencies, to insure the availability of funds for contemplated transactions. Such vendors may place "holds" or debits that are unpredictable both in terms of the amount and the time extent of the hold. These holds also have the effect of reducing the funds available to the user of the card, i.e., they reduce the "available balance" unbeknownst to the user.

The debit cards described in this disclosure can provide a means by which to activate and deactivate an automatic savings mode of any specified amount to be subtracted from the available funds upon each debit card transaction or upon some specified series of transactions in other embodiments. For example, a card user may wish to deduct a fixed amount every week from the available balance and have the amount deposited in one of the savings funds.

The debit cards described in this disclosure can include one or more "savings accounts" of money or funds otherwise available on the debit card to the user. Each of these separate funds is termed a savings account or a balance for a particular purpose. When the user loads or tops-up the card, the added funds go automatically to the available balance on the card. The present disclosure provides a convenient method for the user to automatically segregate an amount of money from the available balance on the debit card each time a transaction is made or in another series of transactions in another embodiment. The method is explained with respect to FIG. 1.

Figure 1:
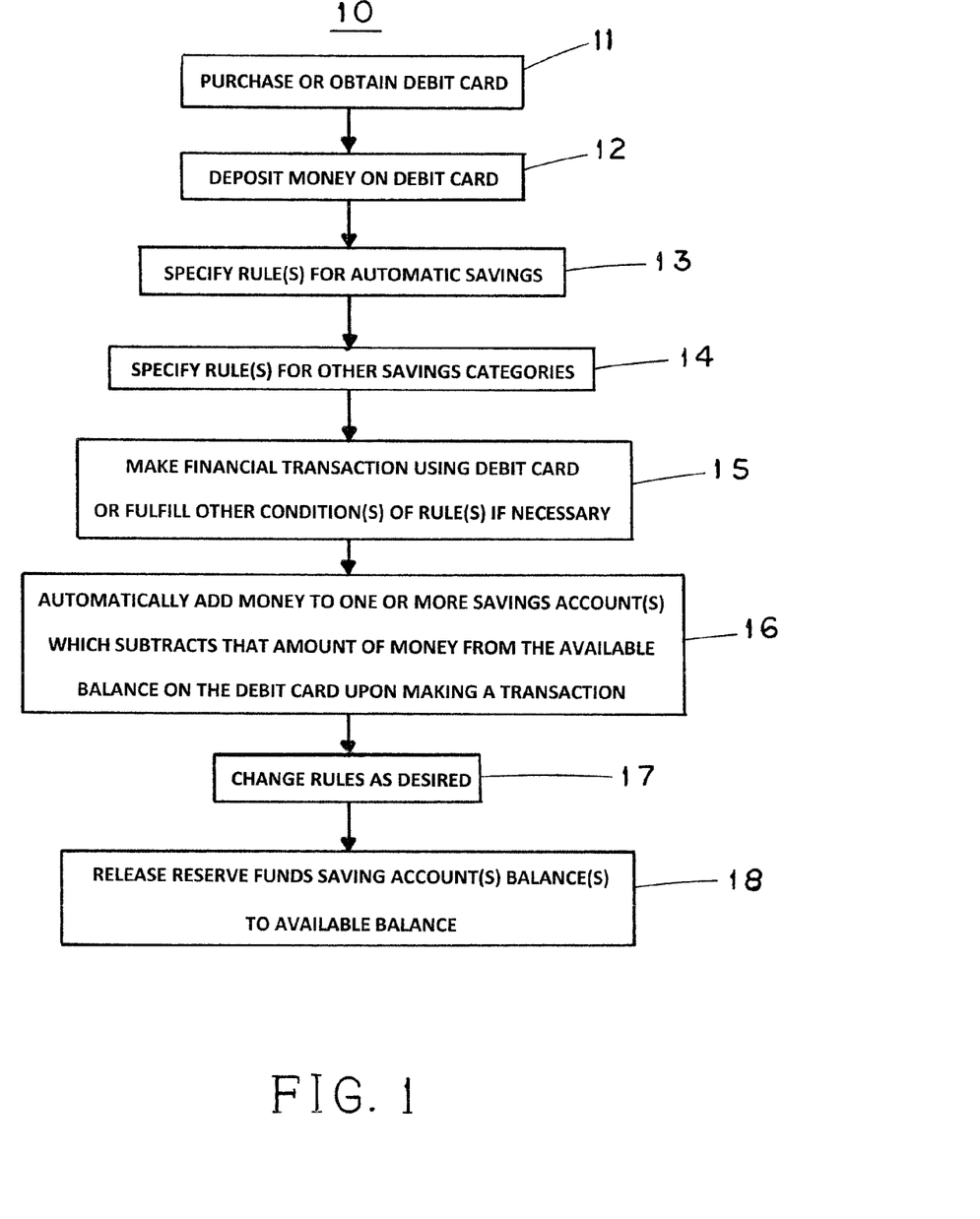
FIG. 1 depicts a method of savings using a debit card.

In the method 10 disclosed in FIG. 1, a user purchases or obtains 11 a debit card. The debit card may be purchased from a financial institution, e.g., from a retail outlet backed by a financial institution. Alternatively, the card may be issued, such as a card issued by an employer. The card may be issued with an initial balance and may be replenished by the owner or user. If money or funds are not already "on deposit" with the card, the user or owner may then deposit or add 12 money or funds onto the card. The important point is the debit card represents an amount of money or funds that is freely available to the owner or user.

The owner or user may desire to set aside or "save" part of this amount as part of an automatic savings plan 13 to be deducted per debit card transaction. This automatic savings amount may be designated for deposit to a savings account category called "S" or "Savings." Alternatively, the user may designate the automatic savings amount 14 to be deposited to another savings category called "E" or "Emergency." Yet alternatively, the user may designate the automatic savings amount 14 for deposit to another of any of three open/yet-to-be-named savings categories, "3," "4," or "5." These categories may include, for example, "Vacation," "Car Repair" or some other user-defined category of savings fund.

Thus, one or more rules may be established or specified 13 for an automatic savings plan. For example, the user may decide that a set amount, say $40, from every deposit to the debit card, is placed into one of the savings accounts. This is particularly useful if the debit card is also the card that is "loaded" each month with the user's monthly wages. The user, in effect, "pays himself or herself first." The user thus acquires a new habit, a process of savings made automatic and effortless, and encouraging the user to save.

As described, the user may set up 14 rules for other savings categories. The purpose or occasion could be La Quinceañera, a Hispanic special birthday celebration, a Christmas fund, a vacation fund, dental work, new car/repair car fund, a particular charitable designation, or other special purpose or occasion. In one embodiment, the user may establish a rule that for each use of the debit card, $1 is set aside for a birthday celebration in a "birthday fund account." In another embodiment, a user may decide that for every use of the debit card, $5 is added to a charity fund account. Other rules for automatic savings may be used instead, according to what the user determines. For example, the user may decide on a given savings amount per time period or per paycheck deposited. According to the first example, a user decides to set aside $1 per transaction for a "birthday fund account." The user purchases groceries 14 at a grocery store, such as Safeway® or Aldi®, and uses her debit card for the transaction. The debit card subtracts the amount of the purchase from the available balance of the debit card, as would be the case in any normal transaction. In addition, in this case, $1 is automatically deducted 15 from the available balance and placed into the "birthday fund" account 16 of the debit card. The rule or rules set up by the user may instead or in addition specify other conditions for automatic savings. Alternatively, or in addition, an automatic savings may occur whenever a deposit is made to the debit card, for example, once a month when the user is paid by his or her employer and these wages have been placed on the debit card. When the condition or conditions required by the rules are fulfilled, the automatic savings entries take place.

As purchases are made through the week and through the month, the individual dollars add up, and soon the user has accumulated an amount of "savings" on the debit card in the "birthday fund account." Of course, the user may change his or her mind, and may then change 17 the rules for savings allocation as desired.

When the user has saved the desired amount, or when the birthday or other special occasion arrives, the user may wish to redeem the accumulated "savings." The user then releases 17 the "savings" back into the available balance and is able to spend the funds as desired, just as the user is able to spend the available balance on the debit card. In other embodiments, the savings accounts need not last for a year, but can last for a shorter term, e.g., a few weeks. An example would be an account in which the user would like to save a smaller amount, perhaps $50, for an anniversary dinner There are many ways to use the savings accounts set up by these methods, including large and small amounts, longer times and shorter times, and so forth. One lesson to be learned is that savings may help users get more enjoyment from their income by wisely choosing to save. Thus, users in these populations may be empowered to manage their finances in ways not previously available to them.

The user may set any rule or rules desired to accomplish the savings goals. In addition to, or in place of transaction conditions, the user may specify a set amount, such as a sum every 7 days or twice a month. When the time has passed, i.e., when the condition of the rule is fulfilled, the computer program managing the debit card subtracts the set amount from the available balance and adds the set amount to the selected savings account.

Figure 2:
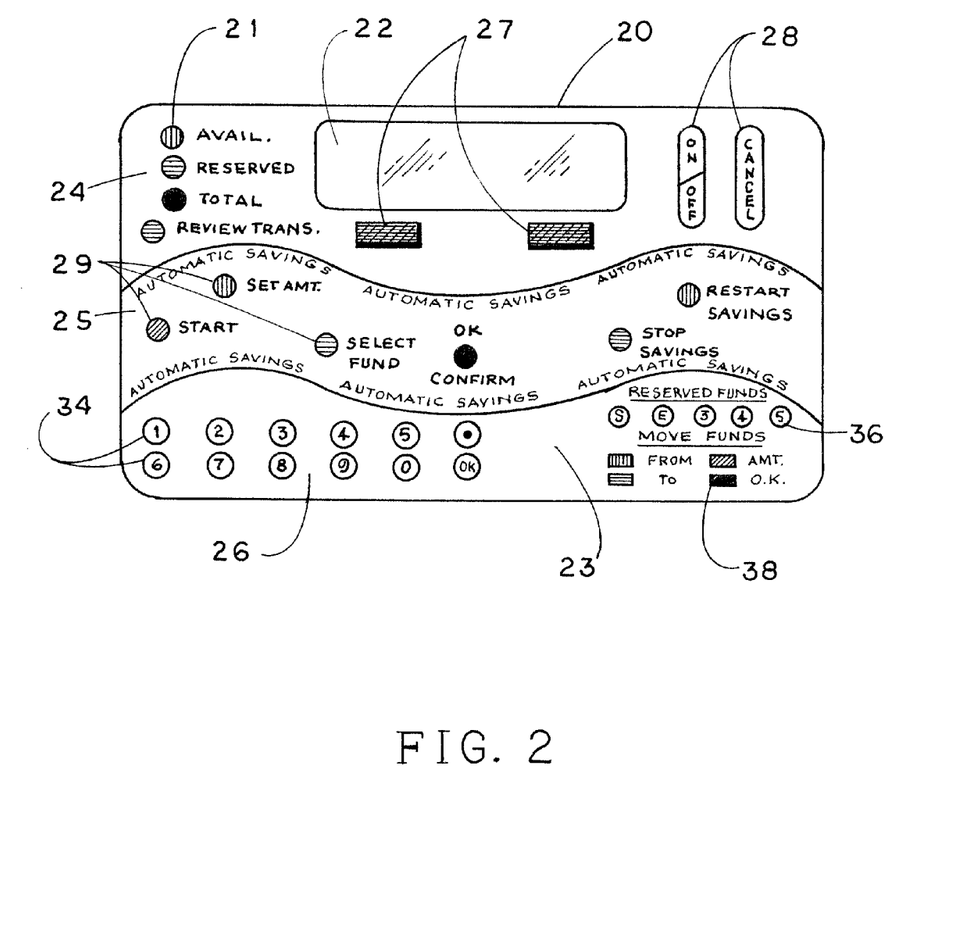
FIG. 2 depicts a front view of a first embodiment of a debit card.

An embodiment of a debit card for accomplishing this process is depicted in FIG. 2. The debit card 20 may be made of plastic, but has an appearance different from a typical debit card. For example, the debit card may include a plurality of additional features, such as a display screen 22 and a variety of functional keys or buttons. In one embodiment, the display screen 22 or the front of the card itself may have a thin, tough covering 23, such as a tough glass or plastic covering. The thin tough covering may be a glass covering may be of a chemically toughened glass in which the toughening is accomplished through an ion-exchange process that induces a compressive stress into the glass. One type of such covering is a glass which is immersed in a hot salt solution so that sodium ions in the glass are replaced with larger potassium ions. The resulting glass has an increased concentration of the larger potassium ions in at least the surface of the glass. The increased concentration induces a compressive stress into the glass, thus chemically toughening the glass. This glass is known commercially as Gorilla® glass. Such a card covering would significantly increase the durability of the card 20 and extend its usage by many years.

In the embodiment of FIG. 2, debit card 20 has an upper portion 24, a middle portion 25, or activity strip, and a lower portion 26. Upper portion 24 is directed primarily toward the display of information concerning the debit card, balances, and so forth. Middle portion 25, or activity strip, is directed to user's primary actions regarding the card, the automatic savings functions of the card. Lower portion 26 is primarily directed to functions and activity of the user, including some details for both the upper and middle portions of the card. The upper portion includes several function keys 28 useful for both information and action aspects of the card, including an On/Off key and a Cancel/Reset key. When the On/Off button is engaged in the "On" position by pressing on the button in an upward direction, the display screen 22 shows the questioning words "PIN NUMBER?," prompting the user to enter his or her PIN number by way of the 34 calculator pad and then pressing the OK button on the calculator pad. There may also be space for a logo for the financial institution that issues the card and space for wafer solar panels 27 for the card. While solar panels are depicted on the front of the card 20, they may instead or also occupy space on a rear of the card.

Additional function keys on the upper portion include buttons 21, requesting display of the "Avail" or available balance for the user, a "Reserved Funds" balance for the user, a "Total" balance for the user, and a key for requesting "Review (of one or more) Transactions." The lower portion 26 includes a plurality of function buttons that form a number or calculator pad 34. The lower portion also includes a plurality 36 of buttons designating particular funds, in this example, a Savings Fund ("S"), an Emergency Fund ("E"), and other numbered funds 3 through 5, which are explained below. Once the PIN number is recognized, the user may check the balance in the Reserved Funds by pressing the appropriate button, for "S," "E" or for Fund "3," Fund "4" or Fund "5." The balance for the selected fund appears in the screen 22. There is a second plurality 38 of function buttons to enable the user to move amounts of his or her savings to and from the various funds or back into "Avail" or available funds.

The middle portion of the card, or activity strip, as noted, is directed to user actions for automatic savings functions of the card. This portion of the card is the primary functionality of the Middle Class America Card, the activity of automatic savings. This middle portion of the card includes a plurality 29 of function buttons. When setting up the card, the user turns on the card 20 by pressing upward on the "On/Off" key among function buttons 28 and responds to the display query "PIN NUMBER?" The user identifies his or her PIN number by use of the keys of the 34 calculator pad and then pressing the "OK" button on the calculator pad. The user may then initiate savings by pressing the "Start" button" and then pressing the "Set Amount" button and keying in the dollar amount chosen (for example, pressing the 34 calculator pad keys: 5, decimal button, 0, and 0, indicating that the amount is to be $5.00) to be deducted from each card transaction, and which is then shown on the 22 display. If the user is in agreement with the dollar amount shown on the display, he or she can then press the "Select Fund" button from among function buttons 29. The user then selects a fund from among the funds listed below among the "Reserved Funds" buttons 36. For example, rather than have the $5.00-per-transaction automatic savings be placed in the "Savings" ("S") account or the "Emergency" (E") account, the user may designate fund number "3" as the "birthday gift" fund and may wish to begin directing savings toward that fund. The user then presses the "3" button from among function buttons "S," "E," "3," "4," and "5" included as part of the 36 "Reserved Funds," and then presses the "OK/Confirm" button in the middle or activity strip of the card. This activity is then set, and the rules are set.

There may be occasions when the user wishes to make an addition to the "Reserved Funds" on a one-time-only basis, for example, on a payday or when the user has received some other deposit on the debit card. For one-time only savings, the user can go to the "Move Funds" section of the card and press the "From" button and the press the "Avail" (available funds) button located in the upper left part of the card. Then he will press the "Amount" button and key in the amount using the calculator pad. The user then presses the "To" button and directs the funds placement into either the "Savings" ("S") account, the "Emergency" ("E") account, or the "3," "4," or "5" account. Once this activity is completed, the user then may press the "OK" button located in the 38 "Move Funds" section of the card. This one-time rule is then set, and the amount is transferred to the indicated fund forthwith.

When the user wishes to stop saving for any reason, the user may simply depress the "Stop Savings" key shown in the 25 middle portion or activity strip. This will cause automatic deductions to stop. In order to resume savings, the user depresses the "Restart Savings" button shown in the 25 middle portion or activity strip. The user may wish to stop savings if the user knows that additional funds may be needed for unexpected bills or other expenses that arise. This layout makes it easy for the user to quickly and easily stop savings, and also to quickly and easily re-start savings as desired.

The bottom portion 26 of debit card 20 also includes two pluralities 36, 38 of function keys, in addition to the key pad. A first set of function buttons 36, the "Reserved Funds" buttons, is keyed to the establishment of the desired savings accounts. This first set of function buttons includes five fund buttons, so that the user may choose which fund to address, as discussed above. The first fund, designating by button "S," is the principal fund, which may be known as the "Savings" fund. The second fund, designating by button "E," may designate the "Emergency" fund, useful for whatever the user considers an "emergency." The remaining buttons, "3," "4" and "5," and so on, designate funds that are begun at the user's discretion. These may be, for example, the birthday fund or dinner celebration funds mentioned above.

The lower portion of the card also includes a second plurality 38 of function buttons, the "Move Funds" buttons. The second plurality of buttons 38 may be used with the fund letter/number buttons 36 to move amounts from one fund to another and to include the use the "Avail" (available) funds button located in the top left part of the card. Thus, if a user wishes to move an amount from one fund to another, the user presses the "From" button from among the "Move Funds" buttons. The user selects the fund number button, e.g., button "S" ("Savings" account) from among the "Reserved Funds" buttons. The user then presses the "Amt" or amount button and enters a desired amount using the calculator pad. Following this, the user then presses the "To" button, followed by the desired fund letter/number, e.g., fund number "3," and then presses the "OK" button in the "Move Funds" section. As soon as this is accomplished, the desired amount is "transferred" from the "S" ("Savings" account) fund to the "3" fund. This same process may be followed if the funds to be moved reside in the Avail (available funds) location. Accordingly, this same process may be used to move funds from a savings account to the Avail (available funds).

Figure 3:
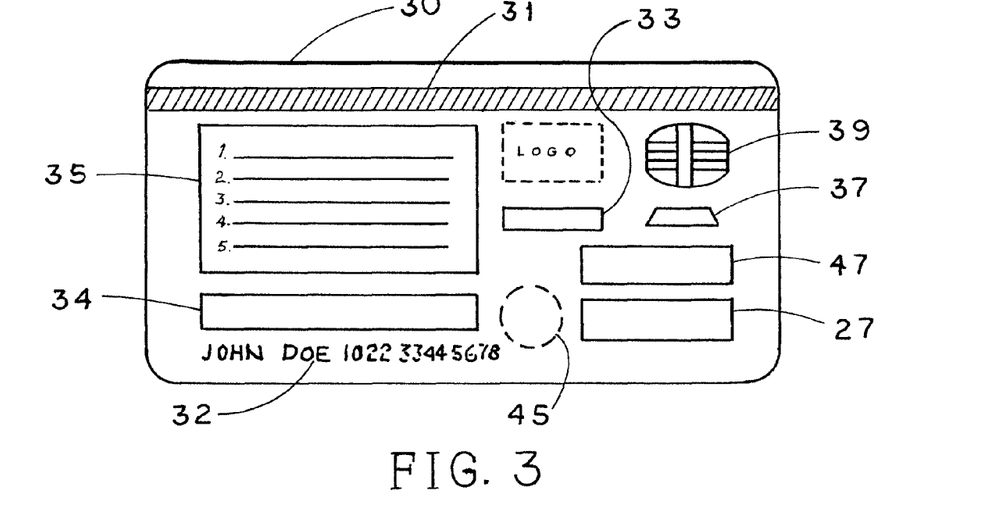
FIG. 3 depicts a back view of the embodiment of FIG. 2.

The rear 30 of the card is depicted in FIG. 3. The rear depicts several features of the card that may be more easily accommodated there rather than on the front of the card. Features include a space 32 for imprinting the card-holder (owner's) name and the card number, and an area 34 for a signature of the card holder. There is also an area 35 for the owner to mark the designations of the funds, e.g., the birthday fund may be fund "#3," and so forth. This area 35 may allow for pre-pasted and numbered sheets for use by the card holder as time passes, and the sheet would be in need of replacement. The sticker may be removed, and a new sticker may be adhered as desired. There may also be an area on the card rear for a logo for the financial institution that issues the card. An EMV chip interface 39 may also reside on the upper portion of the card rear, or any other convenient location, for interfacing with point of sale (POS) terminals of merchants or automated teller machines (ATMs).

A magnetic strip 31 for interfacing with retailers' terminals is placed toward the bottom of the card. The strip is placed so that it does not interfere with the function buttons or keys on the opposite side of the card. Also depicted on the rear of the card are a time/date display 33, an area for insertion and replacement of a battery 45 and a low-battery indicator 37. There may also be space on the rear of the card for a GPS readout function 47 and for solar panels 27.

Most debit cards draw power wirelessly by induction when they are used. This power is used to activate all circuitry on the card, including the EMV chip or other feature to identify the accounts used to pay the merchant. This power also allows the circuitry on the card to store data for each transaction or use of the card. However, a battery may be used to independently power the card for the functions described above in programming the card for savings, including use of the display screen. Alternatively, the card may be programmed by the user's computer for the savings functions described above.

The interface enables a user, for instance, to download data concerning the balances on the card and the history of transactions accomplished with the card, e.g., deposits and purchases made with the card. The interface may be a mini-USB connector or may be an EMV chip. While some embodiments may feature the EMV chip on the front of the card, it may be easier to place the EMV chip on the rear of the card, since the front is somewhat crowded. Alternatively, some of the function keys or buttons could be placed on the rear of the card.

It is desirable that the user be able to access the data on the card. EMV chips are a type of SIM card, similar to those used in cell phones. The EMV chip may be used to store records of transactions conducted with the debit card 20. The EMV chip is readable with a suitable computer and EMV interface. In addition, the debit card 20 may have memory suitable for recording transactions. The mini-USB connector is readable with a suitable mini-USB interface and a computer. Using these devices, the reader is able to access the transactions for which the card has been used.

Figure 4:
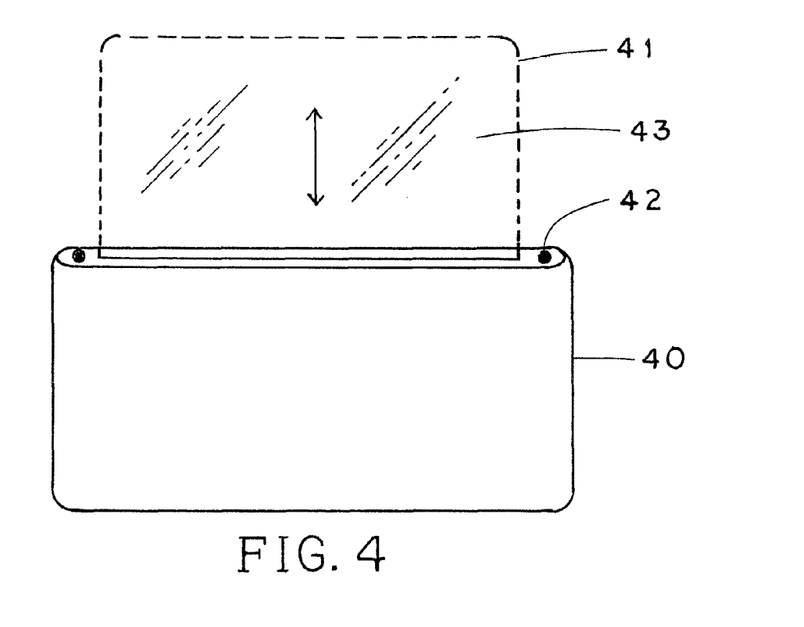
FIG. 4 depicts a schematic view of an alternate embodiment of a debit card.

Other embodiments may include cards that are thicker, such as the rear of the card depicted in FIG. 4. In this embodiment, a wider card 40 accommodates a screen 31 which may move into and out of the main portion of the card. The purpose of having a movable screen that is not on the front of the card is to allow for a card where the front surface of the card may allow for the same number of features but located in a less crowded manner, as shown in FIG. 2, and whose front surface is able to be used to disperse features more widely than in FIG. 2. A card with a movable screen, as shown in FIG. 4, also has the practical effect of adding more surface area to the front of the card, or to any area of the care where the screen was intended for placement.

Screen 41 may include a thin transparent cover of an extra-tough covering 43, such as Gorilla® glass. The lower portion of this card remains 0.76 mm thick for at least the area around the magnetic strip, as depicted in the top of FIG. 3. Other portions of the card, such as the upper portion, may be sufficiently thick to accommodate a movable screen 41 and the mechanisms for allowing movement of the screen into and out of the card. The screen may be very thin and retained in the card by stops and urged from the card by springs (not shown) in the bottom of the card. The user releases the screen for viewing by depressing stops 42 near the top of the card, and re-inserts the screen by depressing the screen until the stops catch the screen. Flex circuitry may connect the screen to the circuitry of the card. The remainder of the card, including the circuitry and the function buttons remains the same, but the screen is somewhat larger for the ease of use by the owner/card holder. This thicker embodiment may include a mini-USB port or connector for interfacing with a computer of the financial institution or the user. The port may make it easier for the user or the financial institution to program the desired automatic savings, to check on previous transactions, and so forth.

Figure 5:
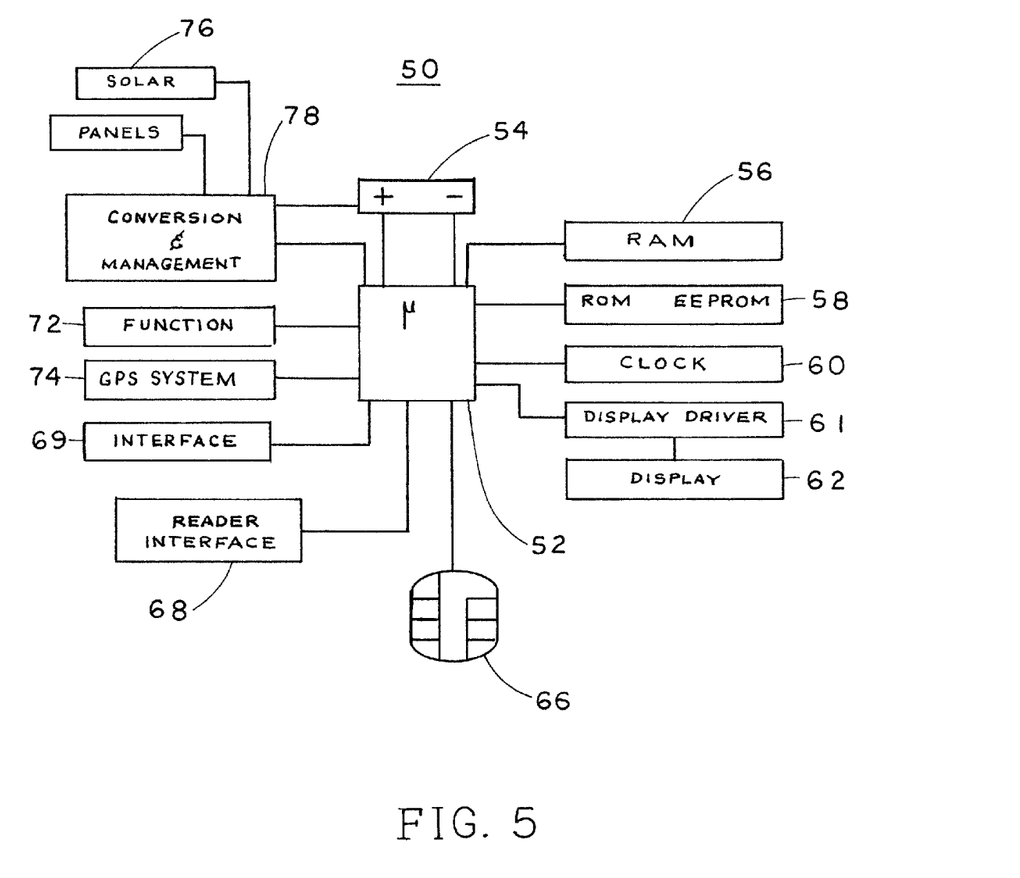
FIG. 5 depicts a circuit diagram of an embodiment.

A schematic circuit diagram 50 for an embodiment of the smart card is depicted in FIG. 5. The circuit 50 includes a processor, such as a microprocessor or microcontroller 52 for handling all aspects of the transfers of funds for the debit card. The card optionally includes a power source 54, such as a battery. While most debit cards, like credit cards, are about 0.76 mm thick, batteries have now been made as thin as 0.3 mm and would be compatible with a debit card. Alternatively, the user would be able to make desired changes to the card by interfacing with the financial institution that issues the card. For example, the desired savings accounts or funds may be established through a computer interface at the financial institution.

The circuitry of the card desirably includes random-access memory (RAM) 56, which may be altered or changed, and permanent or read-only memory (ROM) 58, which may be an EEPROM. The memories are in operable communication with the microprocessor or microcontroller 52. A clock 60 is also included and may serve to keep track of the time, day and date, as necessary. Display driver 61 enables the read-out of information to the user via a screen or display 62 of the debit card. The interfaces 64 of the card may include an EMV interface or chip 66, a magnetic strip reader 68 and an RFID antenna 69.

The details of the EMV interface are well known and typically the interface includes areas for ground, Vcc, Vpp, reset, clock, and one or more I/O pads. This provides an interface for some point-of-sale terminals and computers. These devices allow for communication of the card with the financial institution issuing the card and with merchants, such as point-of-sale (POS) terminals of the merchant. In addition, the user or owner of the card may use a card reader and computer to access these interfaces and thus the data stored on the card, such as the transactions conducted with the card. Other interfaces may also be used.

Other important features of the card include function key interfaces 72. For example, all the function keys in the upper portion 24, middle portion, or activity strip, 25 and lower portion 26 of the card may be gathered into function key interface 72. In one embodiment, the card may also include a global positioning system (GPS) capability 74 which is built into the card. The card may also include solar panels 76 for renewing the power supply or battery 54. Necessary conversion and management circuitry, as well as a battery charging circuit, will be provided as part of the conversion circuitry 78 and connected to the battery. The battery and solar panel features may also be provided as part of a smart battery pack, and connected also to the microprocessor 52 for communicating the health monitoring of the battery pack.

This portion of the present disclosure goes into greater detail about the use and application of features of the Middle Class America Card. Referring to FIG. 2, a user may activate the card by pressing the "On/Off" key in function key group 28 and entering a personal identification number (PIN) or other access code, using the numeric key pad 34 and the nearby "OK" key. The card is secure until the user unlocks or opens the card. The user may close the card by again pressing the "On/Off" key. Access to the card may be accomplished in many other ways. In some embodiments, the user's security may simply be his or her knowledge of the PIN number or other access code. It is also possible to have an unsecured card, but most embodiments will use a PIN number, password or other security feature.

Still referring to FIG. 2, the upper portion 24 of the card 20 includes a number of function keys 21 on the left side of the card. The user presses these function keys, respectively, to access on the screen 22 the amount of the available balance ("Avail"), the amount in all the savings accounts ("Reserved Funds") and a total balance ("Total"). The total balance is the sum of the available balance and all funds accumulated in the one or more savings accounts of the user. There is also a "Review Transactions" function key or button. Pressing this button repeatedly allows the user to browse sequentially through previous transactions of the debit card.

The right side of card 20 also includes two function keys 28. As noted, these keys may include an "On/Off" key and a "Cancel/Reset" key. The "Cancel/Reset" key allows a user to undo a previous entry, e.g., when entering a request or an amount.

The middle portion 25 of the card 20, or activity strip, concerns establishing automatic savings funds by the user and includes only a single set 29 of function keys or buttons. This set 29 of function keys include keys for setting an amount for each transaction to be added to the fund, for selecting the particular fund and confirming the request, "OK/Confirm" as well as for starting and stopping savings For example, a user may press the "Select Fund" button, followed by pressing one of the fund keys "S," "E" or one of keys "3" through "5," in the lower portion of the card. The user then presses the "Set Amount" button, followed by entering the desired amount using the calculator/number pad 34, followed by pressing the "OK" key on the number pad to ensure that the number is correct. The user then presses the "OK/Confirm" button in button set 29 to designate that all these entries are correct and that savings is to begin. This is all that is required to begin saving the designated amount whenever the debit card is used for a transaction. The two additional buttons in set 29, as explained above, may be used for cancelling savings, "Stop Savings," or for resuming savings, "Re-start Savings."

The bottom portion 26 of the card mostly concerns actions taken by the user. The bottom portion 26 of the card includes 3 sets of keys or buttons. The numeric key set 34 includes keys 0-9 and a decimal key, as shown and explained. In addition, the "OK" button on the bottom portion 26 may be used to confirm that the amount entered by the user and displayed on the screen 22 is the correct amount. The "Reserved Funds" keys or buttons 36 and the "Move Funds" buttons 38 have been explained above. In some embodiments, the user may be aided by prompts from the screen 22 for some or all of the steps. In other embodiments, the user may simply step through the keys and await final confirmation that the keys pressed and steps taken were correct.

Once the accounts are established, the debit card owner may check on the accounts and their amounts by stepping through the keys or function switches that are primarily in the top portion 24 of the card 20. For specific savings account amounts in the "Reserved Funds" section 36, the user may simply depress the button to see the amount of funds that is located in that particular account. Thus, with the card activated or turned on, in some embodiments using a PIN number or other pass code, the owner may simply press the "Avail" (available) key in key pad portion 21 to see the available balance displayed on screen 22. As noted previously, the available balance is the amount the user has access to, that is, the total amount "on the card" or the user's financial account, less the amounts the user has chosen to segregate or put aside, as in the several savings accounts. The user may press the "Reserved Funds" key to see the total of all savings accounts displayed.

The user may press the "Total" button to see the total of both the "Avail" available funds and all the savings accounts or "Reserved Funds" available. This "Total" is the amount of money that is actually held by the card holder, and includes the "available balance" as well as all of the "savings" accounts funds. This is the sum of money that belongs to the user by way of the user purchasing the debit card or receiving deposits to the financial account of the user. As noted previously, the "Review Transactions" button may be used to step through a sequence of previous transactions of the debit card. In one embodiment, the user may press the "Review Transactions" button and then press the "Reserved Funds" button, and the screen will step through the past savings transactions, i.e., the dollar by dollar allocations of money to the user's savings account or savings accounts, if there are more than one. Other embodiments may use other procedures to view the financial transactions of the card or savings transactions of the card.

As noted above, the front portion of the card may include the automatic savings functions keys (activity strip) and also the "Move Funds" keys. Besides using the keys to initiate savings, the user may also use these keys to withdraw the "savings" and to place them into the "Avail" or "available" balance portion of the savings. In this situation, the user may first review the fund balances and then decide which fund or funds have the necessary amount or amounts. The user then presses the "Move" key from among the "Move Funds" function keys 38, and then presses the desired fund key, e.g., "Reserved Funds" "3" from among the "Reserved Funds" function keys 36. The user then presses the "Amt" or "amount" key and depresses appropriate keys on the keypad 34 to indicate an amount. The user then depresses the "To" key from function keys 38 to designate the destination of the funds, e.g., the "Avail" key among function buttons 24 for the "available balance." The user thus can transfer savings immediately when an emergency or other need arises.

The above discussion provides many ways for the user to establish and change savings accounts or allocations of funds on the debit card. As also noted, the debit card is issued by a financial institution, such as a bank or an entity that essentially acts as a bank or through a bank. Examples include government payment cards or federal entitlement/transfer cards, or employer payment cards. In every case, there is a financial entity that stands behind the card and takes care of the details, such as the actual transfer of money from the card holder's account to the merchant or other entity with which a transaction is made. When the card is used for a transaction, the information on the card is accessed by the computer or computers of the entity, at least to ensure the identity of the card.

In one embodiment, the entries described and discussed above may also be entered by the card owner into his or her account at the financial institution. While one advantage of the card is that no account per se at a financial institution is required, in effect the owner of a card does indeed have such an account, even if its existence is completely transparent to the owner. Thus, a user may access the account via computer, much as a checking account or savings account may be accessed by the owner. The entries required to establish and to change savings accounts may be made to the user's account via computer. Updating occurs whenever the owner uses the card. Money is subtracted from the "available" balance in accordance with the transaction (purchase); if a savings rule is invoked, the amount of money to be saved is "subtracted" from the "available" balance and is "added" to the specified savings account.

Using a computer adds another way to allocate funds and may make it easy for a user to alter the way the money on the card is managed. For example, the card holder may receive wages via the debit card. The card holder may earn an unexpected amount, perhaps from overtime or from a bonus at work, and may then wish to add some of the extra income to the savings account(s). The card holder may use the card itself or his computer to make one-time savings allocations in this situation.

There are many embodiments of the card that may apply in special situations. For example, a parent may purchase a debit card for use by household members, e.g., a third-party beneficiary, such as a child. The parent or owner of the card may set limits on the use of the card by restricting the funds available on the card, and may also set limits by requiring savings, for example, a dollar or two for every transaction. The limits may be enforced by requiring a password to activate the "Emergency" button, to move funds from "savings" to the "Avail" or "available" balance, or to change the savings allocations.

Embodiments of the card may also account for emergency situations. For example, in cards using a battery, there may be a low battery indicator. If the card is lost or stolen, a user can report the loss to the financial institution and be protected from liability up to the amounts required by current laws of the United States or other countries. The financial institution would then deactivate the card, as is done presently. Of course, if the owner uses a password to activate the card, the owner is already protected. The password may be a PIN, for example, that the user is required to give a merchant for a transaction; or it may be a password simply to activate the card, as described above.

In one embodiment, cards may be sold to users with certain aspects of the savings method already programmed into the Middle Class America Card. In other embodiments, the program may be sold to debit card issuers or financial institutions, such as banks and large entities that issue and administer debit cards. Many other embodiments will be readily apparent to those with skill in financial arts. For example, the Middle Class America Card may be programmed as an application and downloaded to users of iPhones or Android type smart phones. The function keys and alphanumeric keys or areas of a smart phone may function as the several function keys described above for the Middle Class America Card.

This idea, in a simple way, actually allows the user to have at least some of the same benefits that wealthier people already have in place when they utilize services of their own banks, for example, multiple accounts, transfers, wealth management by professionals to guide them, and where, now, the user can "create multiple accounts," "make money transfers," and learn to manage their own, albeit negligible, "wealth," etc.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device operable to execute program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions operable to be executed by the computing or processing device may include but may not be limited to one or more of a CD-ROM, DVD, memory, hard disk, flash drive, RAM, ROM, cache and the like.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like. Some of the storage may be remote, e.g., "stored on the cloud," but accessible nevertheless through the Internet. The location of the computer memory is completely transparent to the user; the card works independently of the location of the off-card computer memory.

The methods and systems described herein may transform physical and/or or intangible items from one state to another. The methods and systems described herein may also transform data representing physical and/or intangible items from one state to another. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor operable to execute program instructions stored thereon as a monolithic software structure, as standalone software modules, or as modules that employ external routines, code, services, and so forth, or any combination of these, and all such implementations may be within the scope of the present disclosure. Further, the elements depicted in the drawings or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code operable to be executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine operable to execute program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventor for carrying out the invention. Variations of those preferred embodiments may become apparent to those of ordinary skill in the art upon reading the foregoing description. Skilled artisans will use such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electronic card for saving money, comprising:
   a debit card having an interface for electronic transaction devices;
   a processor operably connected to the interface and having at least one memory sufficient for storing data and a computer software program, the processor suitable for manipulating data in the at least one memory; and
   wherein the computer program cooperates with the processor and the at least one memory to accomplish the following steps:
   i. maintain an overall balance of the debit card;
   ii. maintain an available balance of the debit card;
   iii. maintain a balance on the debit card for at least one savings account;
   iv. each time a purchasing transaction is accomplished with the debit card, subtract an amount from the available balance and add the amount to the at least one savings account; and
   v. accept changes to the computer program to change the amount,
   wherein the overall balance of the debit card comprises the available balance and a balance of the at least one savings account.

2. The electronic card according to claim 1, wherein the debit card further comprises at least one interface for an electronic terminal.

3. The electronic card according to claim 2, wherein the at least one interface is selected from the group consisting of an EMV chip, a magnetic strip and an RFID interface.

4. The electronic card according to claim 1, wherein the debit card further comprises at least one display for a user of the card.

5. The electronic card according to claim 1, further comprising a plurality of function keys operably connected to the processor.

6. The electronic card according to claim 1, further comprising a plurality of numeric keys operably connected to the processor.

7. The electronic card according to claim 1, further comprising a display screen, wherein the display screen moves out of the electronic card for display and enters the electronic card for storage.

8. The electronic card according to claim 1, further comprising a transparent protective cover atop the card.

9. The electronic card according to claim 8, wherein the transparent protective cover comprises chemically-strengthened glass having inherent compressive stress.

10. A machine readable medium, the machine readable medium having non-transitory program instructions comprising a computer program stored thereon for saving money using a debit card, the program instructions comprising the steps of:
    accepting an available balance on the debit card;
    storing the available balance in at least one memory of the debit card, the debit card also including a microprocessor;
    storing a balance for at least one savings account in the at least one memory of the debit card;
    storing at least one rule for subtracting an amount from the available balance and adding the amount to the at least one savings account;
    subtracting an amount from the available balance and adding the amount to the at least one savings account when a condition of the at least one rule is fulfilled; and
    maintaining the available balance and a balance for the at least one savings account, wherein the computer program cooperates with the microprocessor and the at least one memory to accomplish the following steps:
  i. store an overall balance;
  ii. store the available balance;
  iii. store the balance of the at least one savings account;
  iv. when the condition of the at least one rule is fulfilled, subtract the amount from the available balance and add the amount to the at least one savings account; and
  v. accept changes to the computer program to change the amount,
wherein the overall balance of the debit card comprises the available balance and the balance in the at least one savings account.

11. The machine readable medium according to claim 10, wherein the non-transitory program instructions further include accepting changes to the rules and storing the changes to the rules.

12. The machine readable medium of claim 10, wherein the non-transitory program instructions further include instructions for allowing changes to the at least one rule through inputs from the debit card and from remote programming through a computer.

13. The machine readable medium of claim 10, wherein the non-transitory program instructions further comprise code for sending at least one of the balances to a screen for viewing by a user.

14. The machine readable medium of claim 10, wherein the at least one rule is selected from the group consisting of: each time the debit card is used for a purchasing transaction; once per period of time; and when a deposit over a set amount is added to the debit card.

15. A method of saving money, comprising: depositing an available balance on a debit card; maintaining an overall balance on the debit card; starting at least one savings account on the debit card, the at least one savings account comprising money; specifying at least one rule for adding money to the at least one savings account while subtracting money from the available balance, on the debit card; and automatically adding an amount of money to the at least one savings account and subtracting the amount of money from the available balance according to the at least one rule, on the debit card; wherein the overall balance on the debit card comprises a sum of the available balance and the money in the at least one savings account.

16. The method of claim 15, wherein the at least one rule is selected from the group consisting of: each time the debit card is used for a purchasing transaction; once per period of time; and when a deposit over a set amount is added to the debit card.

17. The method of claim 15, wherein the at least one savings account is an account for a particular purpose.

18. The method of claim 15, wherein the at least one rule comprises that when a transaction is accomplished, a specified amount of money is subtracted from the available balance on the debit card and added to the at least one savings account on the debit card.

19. The method of claim 15, further comprising changing the at least one rule for adding money to the at least one savings account on the debit card.

20. The method of claim 15, wherein the at least one savings account on the debit card comprises two savings accounts on the debit card, and wherein the rules are different for the two savings accounts.

* * * * *